Feb. 16, 1971 G. KAESS 3,564,604
MOTION PICTURE FILM EDITOR
Filed Nov. 25, 1969 2 Sheets-Sheet 1

INVENTOR.
GARY KAESS
BY
Ralph R. Roberts
AGENT

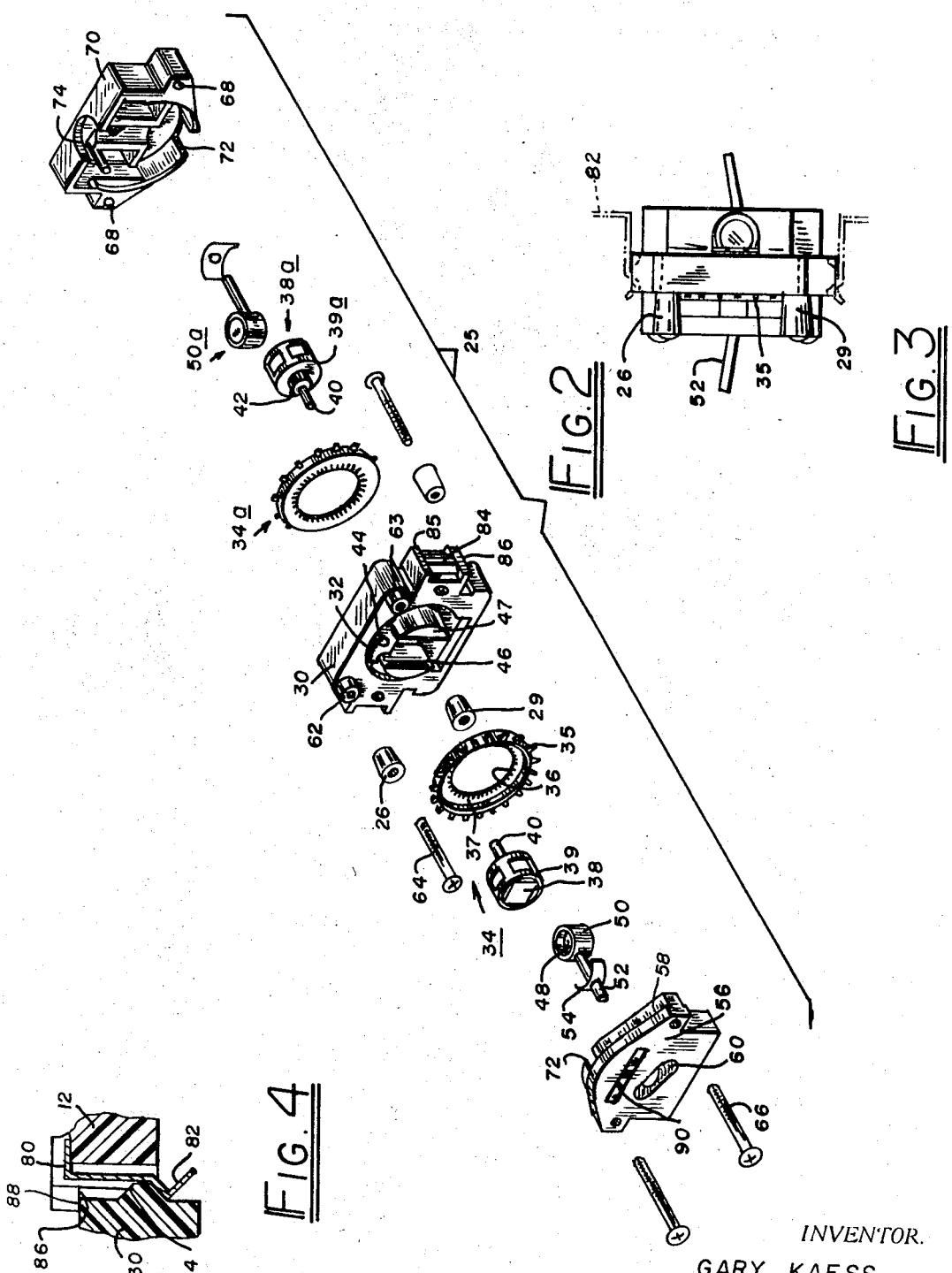

United States Patent Office 3,564,604
Patented Feb. 16, 1971

3,564,604
MOTION PICTURE FILM EDITOR
Gary Kaess, Fair Lawn, N.J., assignor to Atlas-Rand Corporation, Paramus, N.J., a corporation of New Jersey
Filed Nov. 25, 1969, Ser. No. 879,795
Int. Cl. G03b 21/32
U.S. Cl. 352—129
7 Claims

ABSTRACT OF THE DISCLOSURE

An editor and/or viewer for motion picture film is adapted to selectively accommodate two sizes of film. The dual accommodation is provided by a removable film track carrier having a pair of shutters each disposed in way of a film track adapted to be brought in alignment with a projection path.

BACKGROUND OF THE INVENTION

Field of the invention

The field of art to which this invention pertains is the class of "Optics, Motion Pictures" and to the subclass thereunder of "film strip viewing apparatus."

Description of the prior art

Editors and viewers for motion picture film for home use are usually of simple operation and include a viewing screen or plate which is back-lighted by an illuminated optical system. In this system the film is passed through the illuminated path and a shutter system mechanism and focusing means enables the film to be viewed on the screen as it passes through this illuminated path.

The present home use film is usually of the eight mm. type and with the improved eight mm. film, known as "Super 8," there are two commonly used eight mm. films. The physical differences between the original or conventional eight mm. film and the Super 8 mm. film are in the frame size and the sprocket perforations both as to their spacing and placement in the strip of film. The new Super 8 mm. film proposes to provide superior projection characteristics and hence is desired by the home viewer; however, the physical differences between the Super 8 mm. and the regular or conventional eight mm. film are such as to prevent interchangeability in film using equipment such as cameras, splicers, editors, viewers, projectors and the like. This lack of compatability is a problem to owners or users of eight mm. equipment as they are reluctant to acquire new or additional equipment adapted to handle only one type of eight mm film.

SUMMARY OF THE INVENTION

This invention pertains to a motion picture editor or viewer in which a film path extends between two reel holders and intermediate thes reels is an illuminated optical path wherein a removable film track carrier is mounted. This cartridge has a pair of rotary prisms each providing a rotating shutter for the optical path as a film is drawn over a film guideway and in way of a sprocket which, as it is rotated by the advancing film, rotates the prism shutter. This film track carrier, as hereinafter shown and described, has a rotating prism and film guideway provided on one half of the removable film track carrier. On the opposite side from the first half and inverted from the first half is a second half having a like rotating prism and film guideway. One half is arranged to accept the conventional or original eight mm. film and the other half is disposed to accept the Super 8 mm. film. The film track carrier is removable from the editor or viewer body and to use is snapped in place in a pair of clips carried by the base and with the half identified for the determined type or film on the outer side after which the film is easily placed in the film guide path and in engagement with the sprocket by which the shutter is rotated. When the other type of film is to be used in the viewer the film track carrier is removed from the base, is then turned over to bring other guide path in position and is remounted in the base by pushing the film track carrier into the spring clips.

It is an object of this invention to provide a motion picture editor or viewer having a film track carrier providing a pair of film tracks so that one track will accept an eight mm. film and the other track a Super 8 mm. film.

It is a further object of the invention to provide film track carrier mounting means on the base of the editor or viewer which mounting means is disposed to releasably retain the film track carrier in one of two positions. The film track carrier has a pair of film tracks with one track being provided on each side of the cartridge.

It is a still further object of the invention to provide a motion picture film viewer or editor in which a removable film track carrier has a pair of film tracks, one track providing for a conventional eight mm. film and the other track providing for a Super 8 mm. film. To position the film track in an illuminated optical path the cartridge is mounted in a releasable clip means formed in the editor base. To position the other track in the optical path said film track carrier is removed from the base, is turned one hundred eighty degrees and remounted in the same clip means in the base.

There has been chosen a specific embodiment of the editor for motion picture film adapted to selectively accommodate two sizes of film as adopted for use therewith and showing a preferred means for providing two film guides each adapted for positioning in the optical projection path. This specific embodiment has been chosen for the purposes of illustration and description as shown in the accompanying drawings wherein:

BRIEF DESCRIPTION OF THE DRAWINGS

FIG. 2 represents an exploded isometric view of the removable film track carrier and the several components making up this carrier;

FIG. 3 represents in a slightly enlarged scale a cross-sectional view of the film track carrier, and FIG. 4 represents a fragmentary enlarged sectional view showing a spring clip means for releasably retaining the film track carrier in the editor base.

In the following description in the claims various details will be identified by specific names for convenience; these names, however, are intended to be generic in their application. Corresponding reference characters refer to like members throughout the several figures of the drawings.

Figure 1:
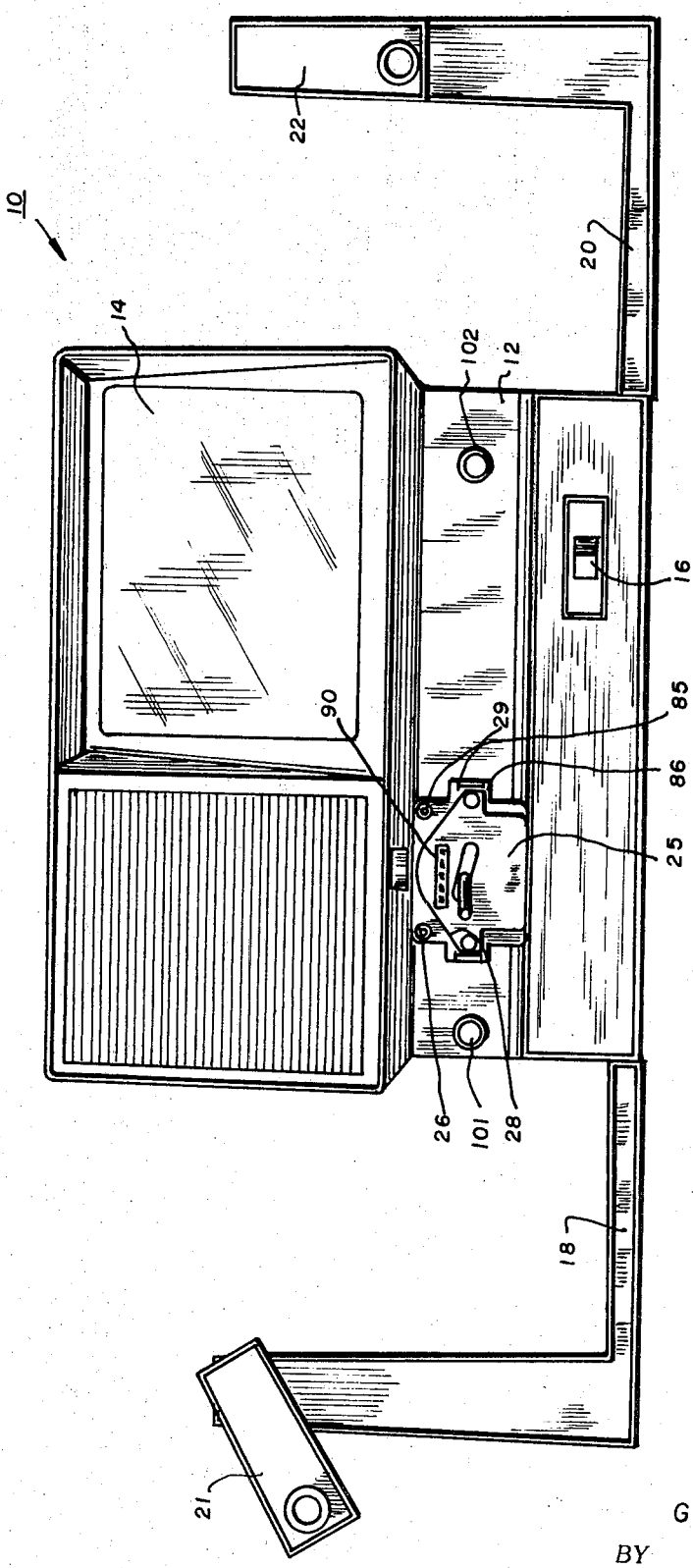
FIG. 1 represents a front view of an editor or viewer with a removable film track carrier mounted in place in the base.

The drawings accompanying, and forming part of, this specification disclose certain details of construction for the purpose of explanation of the broader aspects of the invention, but it should be understood that structural details may be modified in various respects without departure from the concept and principles of the invention and that the invention may be incorporated in other structural forms than shown.

DESCRIPTION OF THE PREFERRED EMBODIMENT

Referring now in particular to FIG. 1, there is shown a general view of an editor or viewer 10 having a base 12 which may be a molding of die casting metal or plastic.

This base includes a viewing screen 14 and a switch 16 by which an illuminating source for the optical path is controlled. Outwardly extending arms 18 and 20 include reel turning crank arms 21 and 22 by which film reels, not shown, are turned. About midway between the crank arms there is removably carried by the base a film track carrier 25 to be more fully described hereinafter. Motion picture film is fed from the left reel to and under a guide 26 carried by the film track carrier thence over the guide surface 28 thence to and under guide 29 and then to the right reel.

Referring next to FIGS. 2 and 3 and the film track carrier 25 wherein is shown a center member 30 having a recess 32 formed with a circular shoulder sized to rotatably receive and retain a sprocket 34 having teeth 35 spaced so as to engage the punched apertures in a motion film. An internal gear 36 is formed in a web or wall portion 37 of said sprocket. Rotary prisms 38 and 38a are shown as having four equally spaced faces and are carried in cages 39 and 39a each mounted on an extending shaft 40. Attached to this shaft 40 or molded as part of the cage is a pinion gear 42 (seen mounted on shaft of prism 38a) which is disposed to engage the internal gear 36 of the sprocket 34. The rotation of the prism is provided by the driving rotation of the sprocket as a film is drawn across the guide surface 28. The shaft 40 is sized and disposed to be mounted and rotatably retained in a hole 44 formed in center member 30. A pair of guide members 46 and 47 is attached to each side of the center member and as formed provides a determined space therebetween. These guide members are disposed in the recess 32 and with their opposing faces these guide members provide a vertical guideway in which is carried a lens 48 mounted in a housing 50. This housing has a control shaft 52 attached to its outer side so as to extend at about a right angle therefrom. This control shaft is shown as having an arcuate flat spring 54 slidably mounted thereon. The diameter of the cage 50 is sized so as to slide within the opposed faces of the guide members 46 and 47 and by these faces to be aligned within the center member 30.

An outer cover 56, as seen in left portion of FIG. 2, has a film guide track 58 formed on its upper curved outer surface and provides therein the film guide surface 28 mentioned in connection with the description of FIG. 1. Also formed in this outer cover 56 is a slot 60. This slot is formed so that when the cover 56 is assembled to the center member 30, the slot is disposed at an angle of about seventy to eighty degrees to the axis of lens 48. This slot is also disposed to slidably receive and retain the extending shaft 52 which is attached to the lens cage 50. Film guides 26 and 29 are mounted on threaded bosses 62 and 63 by means of like screws 64. Assembly screws 66 are made of sufficient length so as to extend through holes in the left cover plate 56 thence through positioning holes in the center member 30 and to and into retaining engagement in threaded holes 68 formed in outer cover member 70, which is the extreme right member shown in FIG. 2.

It is to be noted that in the film guide surface 58 there is provided a cutout portion 72 which is disposed to be aligned with the exposure areas formed in the cage 39 which retains the rotated prism. This cutout 72 is sized so that light, as it is passed through the prism, is also passed through this aperture 72. It is to be further noted that on the diametrically opposite side of this same outer cover member 56 there is formed a like cutout 74 which is placed in alignment with cutout 72 and prism 38 so as to provide a light path for optical illumination to pass through this side of the film track carrier 25.

To the right of the center member 30 there is seen a sprocket 34a which is like sprocket 34 but to accommodate the other film has a different size and spacing of teeth 35. The number of teeth on the gear 42 carried by the shaft extending from the cage of the rotary prism 39a is adapted to mate with the internal gear portion of the sprocket 34a so that the prism is rotated in precise timing with the sprocket 34a. On the opposite or unseen side of the center member 30 there is provided a recess similar to the viewed recess 32; however, this recess is oriented one hundred eighty degrees from the horizontal axis of the block 30. In other words, a hole 44 for the shaft 40 of cage 39a is disposed below the horizontal axis of the block 30 an amount substantially equal to the distance of the hole 44 above the horizontal axis in the viewed recess 32.

In the assembly of the film track carrier 25 the sprocket 34 is rotatably seated in the recess 32 after which the cage 39 of the rotary prism 38 is mounted so that shaft 40 is seated in hole 44 with the gear 42 in mesh with the internal gear portion 36 of the sprocket 34. The lens housing 50 is fitted in between the facing walls of the guide members 46 and 47 so as to be vertically slidable therebetween. These guide members are sized so as to fit in the opening provided by the center portion of the sprocket 34. Spring 54 is mounted on control shaft 52 after which the cover 56 is brought into position against the left face of the center member 30. In like manner the sprocket 34a, prism 38a and lens housing 50a are mounted in the other half of center member 30 after which the outer cover 70 is brought in the inverted position against the center member 30. The screws 66 are then caused to be placed through the aligned holes in cover 56, center member 30, and to and into the threaded holes in cover 70 after which the assembly is tightened together. Screws 64 are used to mount the guides 26 and 29 to the near side of member 30 and like guides are attached by screws 64 to the far side of the block 30.

Referring now in particular to FIG. 4, it is to be noted that the housing base 12 is shown as carrying a spring clip 80 having a deflectable end 82 provided with a V-form in the outer portion of deflectable end. In member 30 there is formed a guideway in which a protruding V-shaped lug 84 is disposed intermediate the faces of the center member 30. Upper and lower guide flanges 85 and 86 are sized to slide in a guideway formed in the base 12. When the assembled film track carrier 25 is brought into the opening in the base 12, the spring 80 and a like spring on the opposite side is caused to be deflected out of the way by the ramp face of the lug 84 until the film carrier has been brought into its innermost position whereupon the spring 80 engages the lug portion 84 by means of the deflectable V-shaped end 82. A stop 88 is formed around the opening in base 12 so that the inward travel of the carrier is precisely positioned by the ends of flanges 85 and 86 engaging stop 88. To remove the film track carrier from the opening in the base 12 it is only necessary to grasp the outwardly extending portion of the said film track carrier and pull the complete film track carrier from retaining grip of the opposed springs 80.

USE AND OPERATION

On the outward face of each outer cover 56 and 70 there is molded or attached an indica 90 which in the present instance indicates either "regular 8" or "Super 8." The indicia indicates to the user the film which the film track carrier is adapted to for use when so mounted in base 12. The track guiding surface is disposed uppermost and the outer indicia 90 indicating the type of motion picture film which is to be used therewith is read by the user after which the film track carrier 25 is snapped into position between the springs 80. The exposed portions of the teeth 35 of the sprocket 34 extending above guide surface 58 engage the film after it has been brought under the guides 26 and 29 and laid on the surface 58 whereupon the advancing of the film will cause the prism 38 to be rotated in way of the illuminated optical path in the conventional manner of a rotary prism shutter. The extending shaft 52 of the lens housing 50 is moved up and down the inclined ramp 60 and causes the lens housing 50 to be moved within the guide of the blocks 46 and 47 so as to move lens 48 in the optical path and provide the desired focus of the illuminated film upon the screen 14.

To change the film track carrier 25 to accommodate the other film, it is only necessary to grasp the film carrier and pull it outwardly from the grip of the springs 80. The user then turns the film track carrier over one hundred eighty degrees as pivoted around the horizontal axis. This will bring the opposite film guiding surface to an upper condition and the face of the other end outer cover face to or in view of the operator. The operator then places the film track carrier into the opening and guideway in the base 12 and then pushes the film track carrier into the retention of the springs 80. With film track carrier now in operating position this other film is brought in way of the sprocket of the other side of the film track carrier and under the two film guides 26 and 29. The advancement of this film causes the sprocket to be rotated to cause the rotary prism to be moved in timed response to the advancement of the film.

In the above-described manner, it is readily apparent that only one film track guide is exposed for placing the film in the film track carrier when said carrier is mounted in the base of the editor. There is also no difficulty on the part of the operator in placing the film on the guide surface 58. The mounted film track carrier shows the user which film is disposed to be used in the editor with the film track carrier so mounted. For example, if the conventional eight mm. film is to be projected, the operator grasps the film track carrier with the indicia indicating the regular eight mm. The film track carrier is oriented so that this indicia on the outer cover is readily visible and readable as the film track carrier is mounted in opening in the base 12. The film guides and guide surface are disposed in the upwardly facing position and the film track carrier is snapped into position. The film is then fed from one reel to the other reel and is placed in this track in the film track carrier and there is no possibility of the editor operating in other than a satisfactory manner for the viewing of a regular or conventional eight mm. film. It is also contemplated that additional film guide rollers 101 and 102 may be positioned and mounted on the front face of the base 12. These rollers 101 and 102 are disposed so that the film is passed below the rollers 101 and 102 and also under the rollers 26 and 29.

If the operator then desires to change the editor to view a "Super 8" mm. film, the film track carrier is grasped and pulled to remove the film track carrier from the editor. The film track carrier is turned over so that the outer cover shows the indicia "Super 8" with the film guides and guide track placed in the upward position. The film track carrier is then reinserted into the opening in the film base and is then snapped into place to provide a fixed determined position in the illuminated guide path. The lens 48 is then adjusted after which the film is fed back and forth over the sprocket 34 to cause the rotating prism shutter to operate in timed relationship with the sprocket and the illuminated "Super 8" film is then viewed and edited as desired.

It is, of course, to be recognized that instead of being removable, as shown, the film track carrier 25 could be rotated around a horizontal axis or be mounted on another pair of pins so that it could be rotated around another axis. It is, of course, noted that it is quite desirable that only one side be presented to a user so that he is certain of the arrangement and the film for which the editor or viewer is to be used.

Terms such as "left," "right," "up," "down," "bottom," "top," "front," "back," "in," "out" and the like are applicable to the embodiment shown and described in conjunction with the drawings. These terms are merely for the purposes of description and do not necessarily apply to the position in which the film track carrier may be constructed or used.

The conception of the film track carrier and its application is not limited to the specific embodiment shown but departure therefrom may be made without sacrificing its chief advantages and protection is sought to the broadest extent the prior art allows.

What is claimed is:

1. A motion picture film editor adapted to selectively accommodate two sizes of film through the placing of one of two film tracks on a film track carrier in way of a projection path, said editor including (a) a base; (b) an illuminated optical path provided in said base and including a viewing screen in way of said path; (c) means for storing a motion picture film and for moving said film to and past the illuminated optical path; (d) a film track carrier of integral construction and disposed to be removably carried by the base, said carrier having a first film tack guide formed thereon and disposed on one side of the carrier, said track guide adapted to receive a first size of film as it is brought from over the outer face of said carrier and toward the midportion of said carrier, said track guide positioned intermediate the outer face and the midportion of the carrier; (e) a first optical path through the carrier with an aperture disposed in said film track guide and with said aperture disposed to receive and pass said illuminated optical path as it passes through the film track carrier; (f) a first rotating prism carried by the carrier and disposed in way of the first optical path though the carrier, said first rotating prism being carried on a shaft which is driven by a film driven sprocket rotatably carried on the same shaft; (g) a second film track guide disposed on the other side of the carrier and adapted to receive a second size film as it is brought from over the other outer face and toward the midportion of the carrier, said second film track guide positioned intermediate the other outer face and the midportion of the carrier; (h) a second optical path through the carrier with an aperture disposed in said second film track guide and adapted to receive and pass said illuminated optical path as it passes through the carrier; (i) a second rotating prism carried by the carrier and disposed in way of said second optical path in the carrier, said second rotating prism being carried on a shaft which is driven by a film driven sprocket rotatably carried on the same shaft, and (j) cooperative means provided on said base and carrier for receiving and retaining the carrier in one of two positions and requiring the carrier to be removed from the base and turned from one side to the other side to bring a selected film guide in way of the illuminated projection path and providing that in its mounted condition only one of the film paths is available for receiving and supporting the film.

2. A motion picture film editor as in claim 1 in which the removably mounted film track carrier in said base is carried by a pair of upper and lower guide flanges with a V-shaped lug disposed between the upper and lower flange pair, said guide flanges disposed to slide in and be retained in a guideway in the base and in which there is a spring finger carried by the base, said finger disposed to engage the V-shaped lug so as to urge the film track carrier into a determined stop condition.

3. A motion picture film editor as in claim 2 in which the film track carrier has its first track guide and its second track guide positioned on diametrically opposite sides of the film track carrier when the axis of the film track carrier position is considered as being horizontal.

4. A motion picture film editor as in claim 2 in which each optical path in the film track carrier further includes a projector lens which is adjustable by means of an externally manipulable control shaft.

5. A motion picture film editor as in claim 4 in which each projector lens is carried by a cage slidable in a guide means formed in the film track carrier housing and in which the lens cage has a control shaft attached to and extending therefrom, said control shaft extending through a slot formed in an outer face member of the film track carrier, said slot disposed at an angle to the plane of the horizontal axis of the film track carrier.

6. A motion picture film editor as in claim 2 in which the film track carrier has said film track guide surfaces formed with converging upwardly sloped surfaces and with the apex which join the sloped surfaces being an arc of selected radius, and in the midportion of this arcuate surface there is formed the aperture providing one end of an optical path through the film track carrier.

7. A motion picture film editor as in claim 6 in which there are film guides provided on the film track carrier with one of said guides disposed adjacent each converging sloped film surface, the guides disposed so that the film as it is fed to and over the film guide surface is deflected onto the arcuate apex of the film guide surface.

References Cited

UNITED STATES PATENTS

| 3,296,926 | 1/1967 | Kapilow | 352—129X |
| 3,446,549 | 5/1969 | Husted | 352—129X |
| 3,447,866 | 6/1969 | Heisler | 352—129X |
| 3,507,569 | 4/1970 | Goto | 352—129 |

FOREIGN PATENTS

| 1,508,543 | 1/1968 | France | 352—129 |

LOUIS R. PRINCE, Primary Examiner

J. W. ROSKOS, Assistant Examiner

U.S. Cl. X.R.

352—80